May 1, 1945.　　　R. L. HALLOCK　　　2,374,679
FASTENING DEVICE
Filed May 6, 1943　　　3 Sheets-Sheet 1
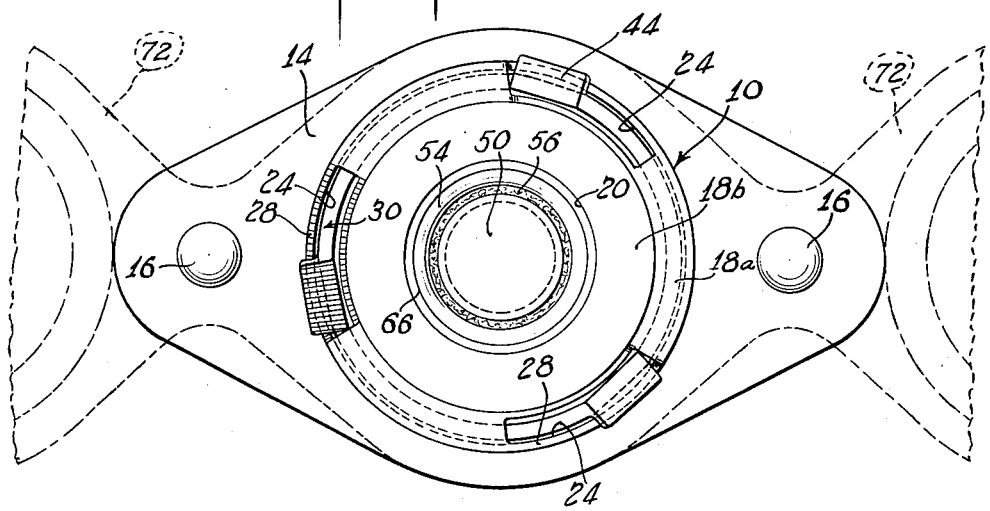
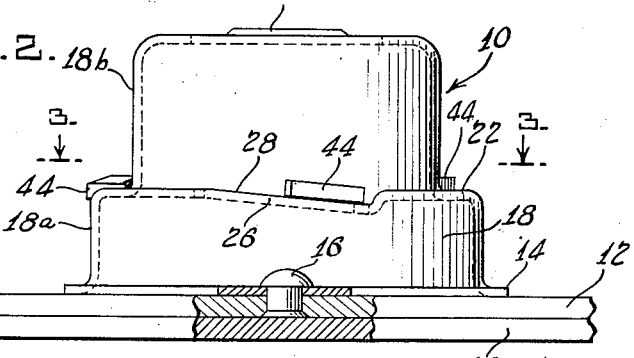
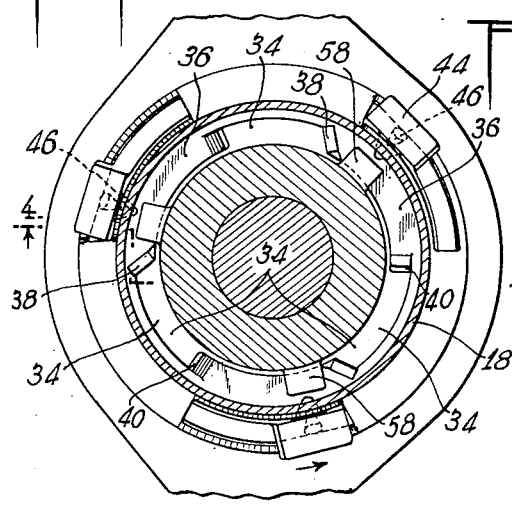
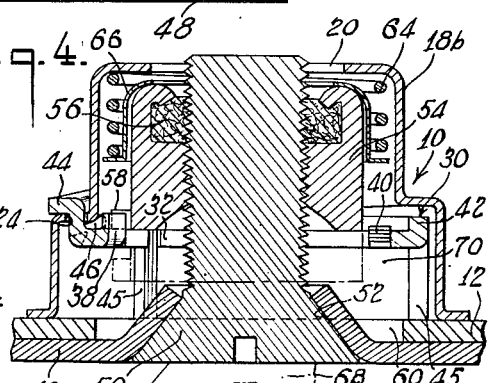
INVENTOR.
Robert Jay Hallock
BY
Jarvis C. Marble
his ATTORNEY May 1, 1945. R. L. HALLOCK 2,374,679
FASTENING DEVICE
Filed May 6, 1943 3 Sheets-Sheet 2
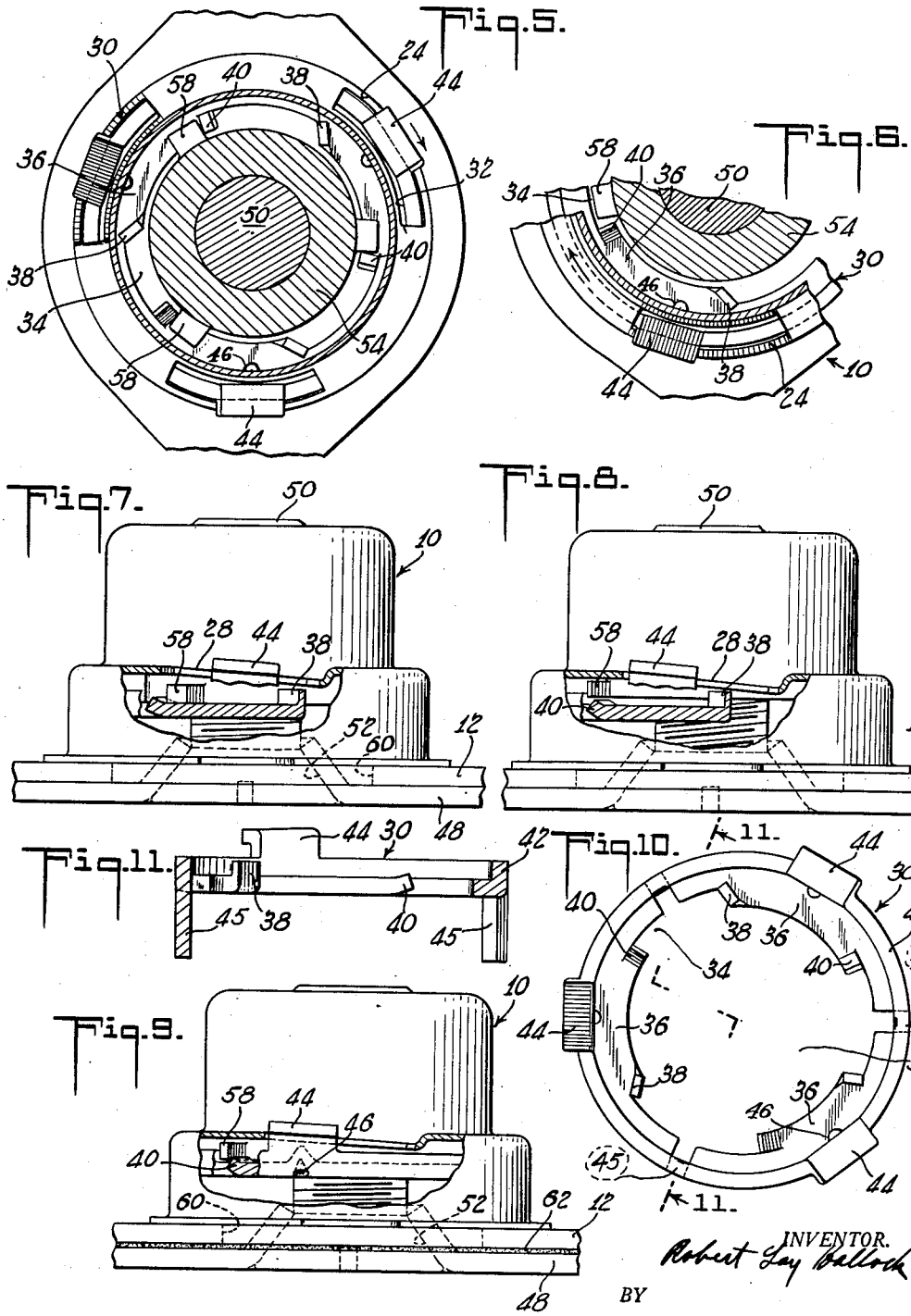

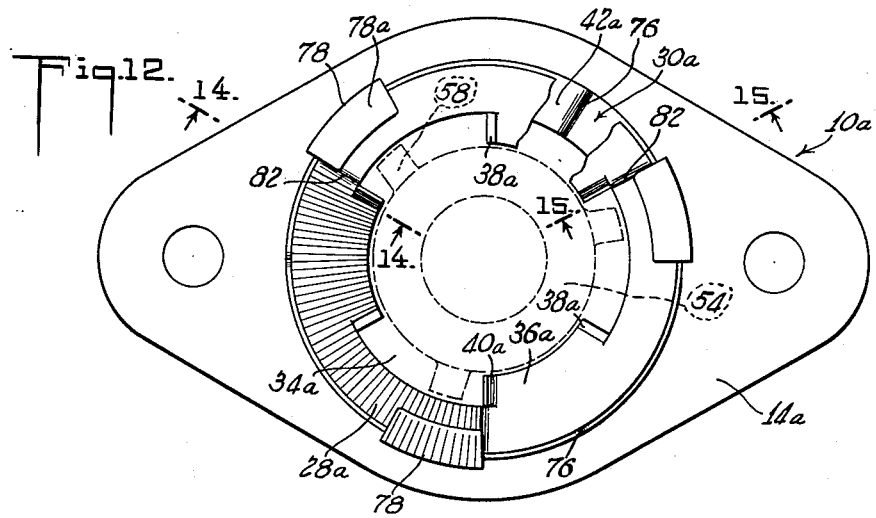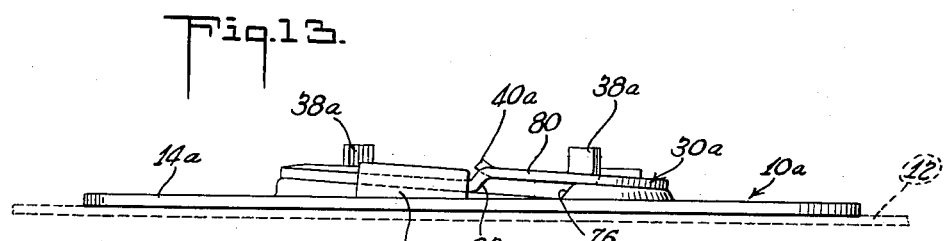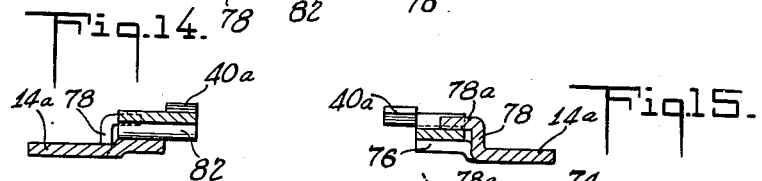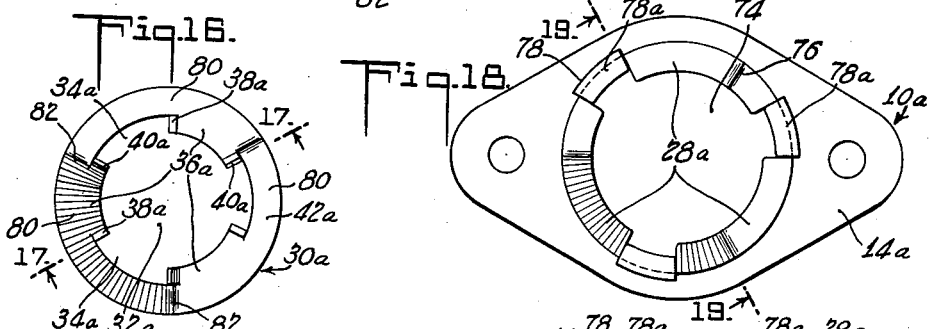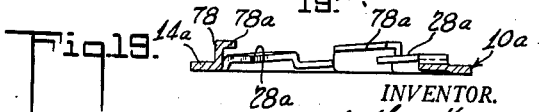

Patented May 1, 1945

2,374,679

UNITED STATES PATENT OFFICE 2,374,679

FASTENING DEVICE

Robert Lay Hallock, Larchmont, N. Y., assignor to Elastic Stop Nut Corporation of America, Union, N. J., a corporation of New Jersey Application May 6, 1943, Serial No. 485,932

20 Claims. (Cl. 24—221)

The present invention relates to fastening devices and has particular reference to the type frequently referred to as plate fasteners, for detachably securing to a thin plate structure another body such as a cover plate or the like.

In sheet metal structures, particularly as employed in aircraft construction, it is in many instances desirable to be able to quickly remove and attach cover plates covering access openings or the like in sheet metal plates which are too thin to enable satisfactory screw threaded connections to be made direcly thereto. In such cases, it is also often desirable to attach the cover plate at relatively closely spaced intervals along its perimeter in order to prevent vibration and in some cases in order to insure a tight seal between the edges of the cover plate and the perimeter of the aperture which it covers. Consequently, as a relatively large number of fastening devices is required in order to facilitate quick detachment and attachment of the one part to the other, such fastening devices should be more quickly releasable than by unscreweding a bolt or screw from a retaining nut.

Numerous forms of quick detachable fastening devices have heretofore been developed but most of such devices are of a bayonet or latching nature which require yielding means such as springs to be relied upon for the force required to hold the parts together when they are in attached relation. Such devices are not entirely satisfactory because of the yieldable nature of the connection which may permit parts to pull apart to a greater or lesser extent under stress. Other forms of fastening means have also been developed in which a positive connection is afforded, but insofar as I am aware all such prior devices are deficient to greater or lesser degree in meeting all of the requirements for a satisfactory device which include in addition to that of providing a positive yet quick detachable connection, compactness, light weight, simple and rugged construction and the ability to be readily connected to effect the desired attachment even when the surfaces of the bodies to be connected are separated to some extent by distortion or by dirt or grit which may have adhered to one or both of the surfaces which are normally secured in contacting relation.

The general object of the present invention is, therefore, to provide a new and improved fastening device for the purpose described which will provide a quickly detachable connection between two separable bodies, which will afford a positive mechanical connection between such bodies that is not dependent upon spring pressure to hold the bodies in attached relation, which will be readily operable to attach bodies, the surfaces of which may be separated by warping or by extraneous material therebetween, which will be simple and rugged in construction, light in weight and cheap of manufacture, and which will provide visible means to indicate whether the device is engaged or disengaged.

For a better understanding of the manner in which the above general object and other and more detailed objects of the invention are attained and the advantages to be derived from use of the invention, reference may best be had to the ensuing portion of this specification taken in conjunction with the accompanying drawings, which disclose by way of example, but without limitation, suitable structural examples of devices for carrying the principles of the invention into effect. In the accompanying drawings, Fig. 1 is a plan view of a fastening device embodying the invention;

Fig. 2 is an end elevation looking from the left of Fig. 1;

Fig. 3 is a section taken on the line 3—3 of Fig. 2;

Fig. 4 is a section taken on the line 4—4 of Fig. 3;

Fig. 5 is a section similar to Fig. 3 showing the parts in a different relative position;

Fig. 6 is a fragmentary section similar to Fig. 5 showing the parts in still another relative position;

Figs. 7, 8 and 9 are elevations partly in section illustrating relationship of certain parts in different positions.

Fig. 10 is a plan view of one of the members of the device of Fig. 1;

Fig. 11 is a section taken on the line 11—11 of Fig. 10;

Fig. 12 is a plan view of another form of fastening device embodying the invention;

Fig. 13 is a side elevation of the device shown in Fig. 12;

Figs. 14 and 15 are fragmentary sections taken on the lines 14—14 and 15—15 respectively of Fig. 12;

Fig. 16 is a plan view of one of the members of the device shown in Fig. 12;

Fig. 17 is a section taken on the line 17—17 of Fig. 16;

Fig. 18 is a plan view of another member of the device shown in Fig. 12; and

Fig. 19 is a section taken on the line 19—19 of Fig. 18.

Referring now to the figures, 10 designates what may be termed a carrier member adapted to be secured to a plate structure such as that indicated at 12. In the form illustrated, the member 10 comprises a base flange 14 adapted to be secured to the plate structure as by means of rivets 16 and a circular housing or cage portion 18, the lower part 18a of which is of larger diameter than the upper part 18b. At its upper end, the member 10 is preferably apertured as at 20.

As will be seen from Figs. 1 and 2, an annular shoulder 22 is provided between the upper and lower parts 18a and 18b of the carrier member and peripherally spaced arcuate slots 24 are provided in this shoulder, the portions of the shoulder where these slots are made being inclined with respect to the plane of the base of the member as indicated at 26 in Fig. 2 to provide inclined surfaces 28 which are in the nature of cam surfaces. For reasons which will hereinafter be explained, the angle of inclination of surfaces 28 is relatively slight.

Referring now more particularly to Figs. 10 and 11, an annular bearing member 30 is shown which is provided with a central aperture 32, the margin of which is notched at equidistantly spaced places 34 to provide between the notches a series of perimetrally interrupted bearing surfaces 36. At one end of each of these bearing surfaces, a part of the material is bent upwardly to provide a stop 38 and at the opposite end of each of these surfaces, the material is bent upwardly to provide an inclined cam surface 40, the angle of inclination of which with respect to the plane of the bearing surfaces is substantially greater than the angle of inclination of the cam surfaces 28 on the carrier member. The bearing member 30 is further provided with a rim portion 42 and from the upper edge of this rim peripherally spaced tongues 44 are provided. Also, equi-distantly spaced legs 45 are formed, and bent down from the rim portion 42 (see Figs. 4 and 11). At peripherally spaced places, preferably coincident with the tongues 44, the material of the member is deformed to provide projections 46 extending upwardly from the outer portions of the bearing surfaces 36.

As will be seen from Figs. 1 to 4, the bearing and carrier members are assembled together, the bearing member being inserted through the bottom opening of the carrier member before the tongues 44 are bent outwardly so that the tongues pass through the slots 24. Thereafter the tongues are bent outwardly as shown in the figures so that they bear on the inclined cam surfaces 28.

As will be observed from the drawings, when the parts are assembled, the bearing member has limited turning movement relative to the carrier member, the extent of such movement being limited by the lengths of the slots 24. Also, from Fig. 2 it will be observed that when the bearing member turns relative to the carrier member it also moves toward or away from the base plane of the device because of the inclination or slope of the cam surfaces 28 on which the tongues 44 ride. As will be seen more clearly from Fig. 4, the projections 46 bear against the inner surface of the wall of the carrier member and act as guides to insure minimum play between the parts except for the intended relative turning movement. Further, it will be noted that when the bearing member is in its position closest to the plane of the base of the device, the lower ends of the legs 45 are substantially in that plane.

The parts just described are adapted to cooperate with a fastening member which engages a part such as a plate 48 that is to be attached to plate 12. This fastening member in the embodiment illustrated comprises a flat headed machine screw 50, the head of which bears against a suitable indented aperture 52 in the plate 48 and which has threaded thereon a nut 54, the construction of which is such as to provide a frictional grip between the screw and the nut. While the invention is not limited to any specific form of nut, a necessary characteristic is that the nut shall be sufficiently tight on the screw to require an appreciable amount of torque to turn the nut on the screw. Advantageously the nut may be of the self locking type embodying the principles of the invention of T. G. Rennerfelt disclosed in U. S. Patent 1,550,282, and such a form of nut is illustrated by way of example in the present embodiment of the device. In this form of nut the body is recessed at one end of the bore to receive a fibre locking insert 56, in which threads are formed by the screw when the nut is first applied and which operates to provide a frictional grip between the nut and the screw. The nut is further provided with a series of radially extending projections 58 at the base of the nut body, these projections being peripherally spaced to correspond with the spacing of the bearing surfaces 36 on the bearing member. In the embodiment illustrated the cam slots in the carrier member, the bearing surfaces on the bearing member and the projections on the nut are each three in number. It will be evident that other numbers may be employed, but for reasons hereinafter more fully appearing a minimum of three is desirable.

In order to effect a connection between the parts 12 and 48 which are to be connected, the nut 54 is inserted through a suitable aperture 60 in the plate 12 and through the aperture 32 in the bearing member 30, the nut being turned to a position such that the projections 58 on the nut body are in registry with the recesses 34 between the bearing surfaces 36. Assuming for the purpose of explanation that the nut is positioned on the screw 50 so that when the parts 12 and 48 are flush against each other and the head of the screw bears directly on the part 48, the nut will be inserted far enough so that the projections 58 will clear the tops of the cam surfaces 40 on the bearing member. The fastening member consisting of the screw and nut is then turned as a unit through a part of a revolution so that the projections 58 pass over the bearing surfaces 36 until they come into contact with the stops 38. If the bearing member is in a position other than with the tongues 44 at the lower ends of the slots 24, continued turning of the fastening member will rotate the bearing member until it reaches the end position shown in Figs. 1–3. Thereafter, further turning of the screw 50 will operate to advance the nut on the screw so as to clamp the base of the nut against the bearing surfaces 36. It will be noted that when the parts are in this position the bearing member and its bearing surfaces are in the closest possible proximity to the base of the carrier member and the plate 12 to which it is attached. With the parts in this clamped position it is further to be noted that a positive screw threaded pressure connection is established between the parts 12 and 48 and that the former cannot pull away from the latter, as would be the case if the parts were held together by a device for relying on spring tension. Also, in this position of the parts, the lower ends of the legs 46 on the bearing member are positioned to bear on the plate 12 to take up any excessive stress that might be imposed by screwing the nut 54 up very tightly on the screw 50, thus avoiding the possibility of bending the relatively light tongues 44 which would otherwise have to take the entire load.

To detach part 48 from part 12 the screw 50 is turned in a direction tending to unscrew the nut 54. This ordinarily will be counter-clockwise or left-handedly as viewed facing the head of the screw. The first turning movement will operate to relieve the clamping pressure and as soon as this is sufficiently relieved to reduce the frictional pressure lock between the parts, the projections on the nut will tend to slide on the bearing surfaces 36 (which lie in a plane parallel to the base of the device) until they come in contact with the inclined cam surfaces 40 at the ends of the bearing surfaces opposite the stops 38. Thereafter, as the screw is further turned, the nut will momentarily be held against further rotation until it backs off the screw thread sufficiently to permit the bearing member to turn in the carrier member until the tongues 44 reach the opposite or high ends of the cam surfaces 28, in which position the bearing member and surfaces 36 are at their maximum distance from the base of the carrier member and plate 12. This action is illustrated in Figs. 5–8. In Figs. 5 and 7 the parts are shown in mid-position with the projections on the nut engaging the cam surfaces 40 on the bearing member, the nut having been backed off sufficiently to permit the bearing member to move to substantially mid-position in which the tongues 44 are at the centers of the slots 24 and moving in the direction indicated by the arrow in Fig. 5. In Figs. 6 and 8 the parts are shown in released position, the bearing member having been turned until the tongues 44 are stopped by the ends of the slots 24 and the screw 50 having been turned, after the bearing member has reached its end position, until the nut has been backed off the screw sufficiently to permit projections 58 to clear the tops of the cams 40 and move into registry with the recesses 34 between the bearing surfaces. When the parts have reached the positions shown in these figures, the fastening member consisting of the nut and screw assembly is then removable through the central aperture 32 in the bearing member to permit removal of part 48 from the part 12.

The reason for providing the inclined cam connection between the carrier member and the bearing member, and for additionally providing the cams 40 on the bearing member, is to insure that the nut is backed off the screw a predetermined distance from its clamping position before release is effected, and the purpose of the cams 40 is to insure that the projections on the nut will not slide off the bearing surfaces 36 before the bearing member has been shifted relative to the carrier member to its position furthest away from the base of the carrier member and plate 12. This is insured by the fact that the angle of inclination of cams 40 is much greater than the angle of inclination of cams 28. Consequently, the bearing member will turn to its highest terminal position before the projections on the nut will ride over cams 40.

Fig. 9 illustrates the utility of this arrangement. First let it be assumed that the cam surfaces 28 on the carrier member are parallel with the base of the member and plate 12 and that the cam portions 40 are omitted. Further let it be assumed that parts 12 and 48 have been secured together and have been detached. Under the assumed conditions the projections on the nut would have slid off the bearing surfaces upon only sufficient backing off of the nut from its clamping position on the screw to relieve the clamping pressure. Now let it be assumed that it is desired to reattach part 48 to part 12 and that in the interim dirt or other extraneous matter as indicated at 62 had become adherent to the surface of one or both of these parts, or that the plate 48 had become warped or otherwise distorted. If that were the case under the assumed conditions, the nut would not be sufficiently backed off the screw for the projections 58 to clear the ends of the bearing surfaces 36 and if it were attempted to attach the parts by then turning the screw 50 the nut would turn on the screw and move further toward the base of the carrier member, thus aggravating the condition. The attachment of the parts could not then be effected without pulling them apart and backing off the nut by hand sufficiently to compensate for the space between the parts 12 and 48.

With the present arrangement as illustrated in Fig. 9, if on reapplication, dirt or other material or distortion separates the parts 12 and 48, the projections on the nut will strike the ends of the cam parts 40, but since the carrier member is shiftable and furthermore is riding on the high end of its cam, further turning of the screw will operate to cause the projections on the nut to turn the bearing member in a direction bringing the latter closer to the base of the carrier member and plate 12. This will move the cam parts 40 downwardly as viewed in Fig. 9 to permit the projections 58 on the nut to clear them and ride across the bearing surfaces 36 until they abut against the stops 38 and move the bearing member to its lower terminal position where clamping is effected. Ordinarily, parts connected with the type of fastener under consideration will not be attempted to be fastened with large accumulations of foreign matter on their surfaces but unless some clearance is provided, very little distortion or foreign matter on the surfaces would cause the projections on the nut to fail to slide over onto the bearing surfaces.

In structures of the kind under consideration it is extremely useful for one to know whether or not any given fastening device is secured, and in accordance with the present invention this is accomplished by means of a simple tell-tale construction which will now be described. Referring more particularly to Fig. 4, the upper portion 18b of the carrier member provides a housing for retaining a spring 64, one end of which abuts against the upper end of the housing and the lower end of which includes an annular spring retainer 66 of cup like form which is also adapted to be engaged internally by the nut of the fastening member when the latter is inserted. As will be evident from a consideration of this figure, the spring 64 acts to move the fastening member downwardly to eject it whenever the projections on the nut are in registry with the recesses 34 in the bearing member so that the nut can pass through the latter member. Consequently, if the parts 12 and 48 are together and the projections on the nut are not on the bearing surfaces 36, the fastening element will be in a position indicated by the dotted line 68. When the tell-tale feature is employed the spring and retainer 66 are inserted into the upper portion of the carrier member before the latter is assembled with the bearing member and as will be apparent from Fig. 4, these parts are retained in this assembled position when the fastening element is not in the carrier member, by engagement of the bottom of the spring retainer against the upper surfaces of the bearing member.

The spring and retaining members also perform another function, by serving to center the nut relative to the aperture 32 in the bearing member when the nut is inserted.

Still another advantageous feature is effected by forming the carrier member so that the bearing member is displaced some distance from the face of the member 12 to which the carrier member is attached, thus providing a space 70 between the plate 12 and the bottom of the bearing member. It will be apparent that before the nut can pass through the aperture in the bearing member, the projections 58 must be in registry with the recesses 34 and if the bearing member were immediately adjacent to the plate 12 and the projections on the nuts of one or more fastening elements were not in registry with their cooperating recesses, the parts 12 and 48 could not be brought together until all fastening elements were turned to positions permitting the projections on the nuts to pass through the bearing members. With the present arrangement the plates 12 and 48 can be brought into contact with each other regardless of the position of rotation of the nuts relative to the respective bearing members, since the space 70 provides a clearance space for the projections on the nuts. Thus, after the plates are in proper contacting relation any fastening element which is in improper position for the projections on the nut to pass through the bearing member can readily be turned to the proper position so that the fastening element can be fully inserted to be turned to clamping position.

As previously noted at least three bearing surfaces on the carrier member and a corresponding number of projections on the nut are advantageously employed and this is particularly true in case the carrier member is shaped so that the bearing member is spaced an appreciable distance from the base of the device to provide the clearance space 70. The reason for this is that with at least three bearing contacts spaced equi-distantly around the perimeter of the fastening member, substantial resistance is provided against tilting of the fastening member in the event lateral stresses on the parts 12 or 48 might tend to cause them to shift laterally relative to each other. Thus, considerable resistance to such shifting is provided by the fastening devices in addition to that provided by friction between the surfaces of the parts which, with this device, may be solidly and unyieldingly clamped together.

While the invention has been described as embodied in a single fastening unit, a multiple unit structure may readily be provided by forming a series of carrier member units from a continuous strip of material. Ordinarily the parts will be made of sheet metal, die drawn or stamped to desired configuration and, as will be appreciated by those skilled in the sheet metal art, it is readily possible to draw a series of carrier member units from a single strip, in which case the individual units are advantageously connected by relatively narrow neck portions capable of being bent so that the strip may for example be shaped on the job so that the individual carrier members will register with apertures in a plate structure following a curved or irregular line. Such a construction is indicated by the dot and dash construction lines 72 in Fig. 1.

In some instances all of the advantageous features of construction embodied in the form of the device which has been described may not be required, and in Figs. 12 through 19 there is illustrated a different form of device embodying certain features of the invention to the exclusion of others. Referring now to these figures, the carrier member 10a is provided with a flanged base portion 14a adapted to be riveted or otherwise secured to a plate structure 12, and has a central aperture 74. The material of the member at the margin of this aperture is deformed to provide three sloping cam surfaces 28a each of approximately 120° extent which correspond in function to the cam surfaces 28 in the form of device shown in Fig. 1. At their ends these surfaces are seperated by step-like shoulders 76 and intermediate the ends of each of these sloping cam surfaces the material is struck up to provide tongues 78 which in the figures are shown bent over as at 78a into their final positions for the retention of the bearing member. The diameter of the aperture 74 is such as to permit passage therethrough in any position of rotation of the clamping nut 54 with its projections 58 (shown by dot and dash construction lines in Fig. 12).

The bearing member 30a has an outer rim portion 42a which is deformed to provide three sloping cam portions 80 each of approximately 120° extent, the angle of inclination of these portions being the same as the angle of inclination of the cam surfaces 28a on the bearing member. These inclined surfaces are separated by step-like shoulders 82. The central aperture 32a is recessed at three equi-distant spaces as indicated at 34a to provide the intervening bearing surfaces 36a each provided with a stop 38a at one end and an inclined cam 40a at the other. In the embodiment illustrated, the diameter defined by the bottoms of the recesses 34a is equal to the diameter of the aperture 74 in the carrier member and the outer diameter of the bearing member 30a is the same as the outer diameter of the inclined cam surfaces 28a on the carrier member.

The two parts just described are assembled by placing the bearing member on the carrier member with the several inclined surfaces in registry with each other, before the tongues 78 are bent over to the position shown in the figures. Thereafter these tongues are bent to the positions indicated to hold the parts in assembled relation, the tongues, however, not being bent down on the bearing member sufficiently to clamp the two parts together against turning movement relative to each other.

As will best be seen by reference to Fig. 13, the bearing member 30a has a limited rotational movement relative to the carrier member 10a, the limit of this movement in one direction being established by the abutment of the shoulder portions 82 on the bearing member against the shoulder portions 76 on the carrier member and the limit of movement in the opposite direction being established by the abutment of the shoulders 82 of the bearing member against the inturned portions 78a of the tongues 78, which overlie the bearing member.

The operation of this form of the device will be readily understood from the previously described operation of the form of the device shown in Fig. 1. The fastening member including the nut 54 is inserted through the opening in the plate 12 with which the opening 74 in the carrier member registers and the projections on the nut pass through the recesses 34a in the bearing member so that upon turning of the fastening member after insertion of the nut these projections will pass over the cams 40a onto the bearing surfaces 36a. Contact between these projections and the stops 38a will operate to turn the bearing member relative to the carrier member to the terminal position in which the bearing member is stopped by contact between shoulders 76 and 82, in which position the bearing member, due to the slope of the cam surfaces 28a on the carrier member, will be closest to the base of the carrier member. Thereafter, further turning of the fastening screw will operate to advance the nut on the screw and clamp the parts together. It will be understood that the specific nature of the part to which the fastening element is attached may vary but that in case it is a plate member such as member 48, the fastening element may advantageously include a machine screw such as that shown at 50, the head of which engages an indented aperture in the plate.

In releasing this form of the device the action is substantially the same as that previously described. As soon as the attaching screw is turned sufficiently to release the frictional lock between the parts, the nut, turning with the screw, turns the bearing member in the direction from its lower position toward its higher position, this requiring the nut to be backed off the screw sufficiently to permit the required movement of the bearing member away from the base of the carrier member and plate 12. Also, while the bearing member may be shaped so that the bearing surfaces 36a lie in a plane parallel to the base of the carrier member when the two parts are in assembled relation, simplicity of manufacture makes it usually preferable to have these bearing surfaces formed to the same slope as the cam surfaces 80. With the latter arrangement it will be evident that with the same degree of slope of the cam surfaces 28a (and a corresponding slope of the bearing surfaces 36a) as that of the cam surfaces 28 in the form of device shown in Fig. 1, a greater total rise or backing off of the nut on the screw will be required before the nut projections 58 will clear the cam parts 40a, than would be the case with the device shown in Fig. 1. The reason for this is that in the present form of the device, a certain amount of rise results from the turning of the bearing member relative to the carrier member from one terminal position to the other, and to this there is added the additional rise required to enable the projections on the nut to move across the inclined bearing surfaces 36a after the bearing member has reached its highest terminal position. Obviously, however, the extent to which the nut must be backed off the attaching screw before it can be released can be made as desired by choice of the angle of slope of the cooperating cam parts of the device.

As compared with the form of the device shown in Fig. 1, the present form does not provide the tell-tale feature nor does it provide a space corresponding to the clearance space 70 provided by the device shown in Fig. 1 which permits the parts such as plates 12 and 48 to be placed together in contacting relation regardless of the position of rotation of the fastening element. In the present form of device, the nut must be turned so that the projections will pass through the recesses 34a between the bearing surfaces 36a before the bodies to be attached can be brought into contact with each other, owing to the fact that unless the projections on the nut are positioned so as to pass through the recesses in the bearing member these projections may not move far enough into the device to be flush with the face of the plate 12. This will, of course, not always be the case, depending upon the relative thickness of the projections on the nut and the thickness of the plate of the other body 12 to which the carrier member is attached.

On the other hand, the parts of the present form of the device are somewhat simpler of manufacture than those required in the form shown in Fig. 1 and the device is more compact axially.

From the foregoing it will be apparent that variation in specific design and construction of the parts may be made within the scope of the invention, which is to be considered as embracing all forms of device falling within the scope of the appended claims.

What is claimed:

1. In a fastening device of the character described, a carrier member adapted to be secured to another body and a bearing member, said bearing member having an aperture shaped to provide a plurality of perimetrally interrupted marginal bearing surfaces for engagement with a fastening element inserted through an opening in said body and said aperture, said members having interengaging portions for holding them in assembled relation while permitting said bearing member to have limited turning movement relative to the carrier member.

2. In a fastening device of the character described, a carrier member having a base portion adapted to be secured to the surface of another body and a bearing member having an aperture shaped to provide a plurality of perimetrally interrupted marginal bearing surfaces for engagement with a fastening element inserted through an opening in said body and said aperture, said members including interengaging portions for holding them in assembled relation while permitting said bearing member to have limited turning movement relative to said carrier member and inclined cam surfaces for altering the distance between said bearing surfaces and the base of the carrier member when said bearing member is turned.

3. In a fastening device of the character described, a carrier member having a base portion adaptd to be secured to the surface of another body and a bearing member having an aperture shaped to provide a plurality of perimetrally interrupted marginal bearing surfaces for engagement with a fastening element inserted through an opening in said body and said aperture, said bearing surfaces having projections providing stops at one end of each of said surfaces and inclined cam projections at the opposite end of each of said surfaces, said members including interengaging portions for holding them in assembled relation while permitting said bearing member to have limited turning movement relative to said carrier member and inclined cam surfaces for altering the distance between said bearing surfaces of the base of the carrier member when said bearing member is turned.

4. A device as set forth in claim 3 in which the cam surfaces at the ends of said bearing surfaces are inclined in the same direction and have a greater angle of inclination than the cam surfaces on which the bearing member turns relative to the bearing member.

5. In a fastening device of the character described, an annular carrier member having a base portion adapted to be secured to the surface of another body and an annular bearing member having an aperture shaped to provide a plurality of perimetrally interrupted marginal bearing surfaces for engagement with a fastening element inserted through an opening in said body and said aperture, said carrier member having a plurality of peripherally spaced cam slots therein providing inclined cam surfaces and said bearing member having a plurality of outwardly projecting tongues extending through said slots and engaging said cam surfaces to provide limited turning movement of the bearing member relative to the carrier member.

6. In a fastening device of the character described, an annular carrier member having a base portion adapted to be secured to the surface of another body and a bearing member having an aperture shaped to provide a plurality of perimetrally interrupted marginal bearing surfaces for engagement with a fastening element inserted through an opening in said body and said aperture, said carrier member having a plurality of perimetrally spaced slots providing inclined cam surfaces, said bearing member having a plurality of tongues passing through said slots and bearing against said cam surfaces to provide limited turning movement between said members and said bearing member further having a plurality of legs projecting toward the base of the carrier member, the length of said legs being such as approximately to bear against the surface of said body when the bearing member is turned to a position in which said tongues engage the ends of the inclined cam surfaces nearest to the plane of the base of said carrier member.

7. In a fastening device of the character described, a carrier member having an annular base portion adapted to be secured to the surface of another body around an opening therein and an annular body portion projecting upwardly from said base portion, said body portion having a plurality of perimetrally spaced slots providing inclined cam surfaces spaced from said base portion, an annular bearing member having an aperture shaped to provide a plurality of perimetrally interrupted marginal bearing surfaces for engagement with a fastening element inserted through said opening and said aperture and having a plurality of tongues extending through said slots and engaging said cam surfaces to provide limited turning movement between said members, and a spring loaded element located in the body portion of said carrier member on the side of said carrier member remote from said body for yieldably engaging said fastening element and tending to force the fastening element outwardly through the aperture in the bearing member when the fastening element is not in engagement with said bearing surfaces.

8. In a fastening device of the character described, the combination with a fastening unit comprising a carrier member adapted to be secured to another body and an annular bearing member having limited turning movement relative to said carrier member and having bearing surfaces adapted to be engaged by a fastening element inserted through an opening in said body and said bearing member, of a fastening member comprising a threaded element adapted to engage a second body to be attached to the first mentioned body and a nut threaded on said element and frictionally engaging the same to require appreciable torque for the nut to turn on said element, said nut having a portion of non-circular section adapted to engage said bearing surfaces in certain positions of rotation and to pass through said bearing member in other positions of rotation.

9. In a fastening device of the character described, an annular carrier member having a base portion adapted to be secured to the surface of another body around an opening therein and a body portion projecting from said base portion, said body portion having a plurality of perimetrally spaced slots providing inclined cam surfaces, and an annular bearing member having an aperture shaped to provide a plurality of perimetrally interrupted bearing surfaces adapted to be engaged by a fastening element inserted through said opening and said aperture and a plurality of tongues extending through said slots and bearing on said cam surfaces to provide limited turning movement between said members, said slots and tongues being located and shaped so that said bearing member is located a substantial distance from the plane of the base portion of the carrier member to provide a clearance space between the bearing member of the surface of the body to which the carrier member is secured.

10. In a fastening device of the characted described, an annular carrier member adapted to be secured to the surface of another body around an opening therein, said member being formed to provide a plurality of inclined cam surfaces around the perimeter of the aperture therein, and an annular bearing member having an aperture shaped to provide a plurality of perimetrally interrupted marginal bearing surfaces and a plurality of inclined cam surfaces adapted to engage the cam surfaces on the carrier member, said members having interengaging portions for holding the members in assembled relation and for limiting the turning movement of the members relative to each other.

11. In a fastening device of the character described, an annular carrier member having a central aperture, the material of said member being shaped to provide a plurality of inclined cam portions around the margin of said aperture with shoulders connecting the adjacent high and low ends of contiguous cam surfaces, and an annular bearing member having a central aperture shaped to provide a plurality of perimetrally interrupted bearing surfaces and having a plurality of inclined cam portions and shoulders complementary to the cam portions and shoulders of said carrier member and adapted to engage the same, said carrier member having a plurality of tongues formed from material at the margin of the aperture therein and peripherally spaced from the shoulders thereon, said tongues being bent over the cam portions of said carrier member to hold the parts in assembled relation with the cam portions in contact with each other, the extent of turning movement between the parts being limited in one direction by abutment of the shoulders on the bearing member against the shoulders on the carrier member and being limited in the opposite direction by abutment of the shoulders on the bearing member against said tongues.

12. In a fastening device of the character described, a fastening unit comprising a carrier member and a bearing member, said members having interengaging parts for holding the members in assembled relation while permitting turning movement of the bearing member relative to the carrier member, said interengaging parts being shaped to cause said bearing member to follow a helical path of travel when it is turned relative to said carrier member, and said bearing member having an aperture through which a fastening element is adapted to be inserted, said aperture being shaped to provide perimetrally interrupted marginal bearing surfaces for engagement with said element and said bearing surfaces having stops associated therewith for limiting movement in one direction of said element relative to said surfaces.

13. For use in a fastening device of the character described, a sheet metal carrier member comprising an annular base portion, a circular body portion extending from said base portion and a plurality of perimetrally spaced slots providing inclined cam surfaces in the wall of said body portion.

14. For use in a fastening device of the character described, a sheet metal member comprising a base portion and an annular body portion extending from said base portion, said body portion comprising a part of relatively large diameter adjacent to the base portion and a part of relatively small diameter remote from the base portion, there being a shoulder portion between said parts and a plurality of perimetrally spaced slots in said shoulder portion providing inclined cam surfaces for engagement with a bearing member having turning movement relative to said carrier member.

15. For use in a fastening device of the character described, a sheet metal carrier member having an aperture therein, the marginal portions of the material adjacent to said aperture being shaped to provide a plurality of inclined cam portions with shoulders connecting the adjacent ends of contiguous portions and tongues formed by material of said member projecting upwardly at perimetrally spaced places around said aperture and adapted to be bent over to retain in assembled relation a bearing member mounted to turn on said cam portions.

16. For use in a fastening device of the character described, a bearing member comprising an annular sheet metal plate having an aperture shaped to provide a plurality of perimetrally spaced marginal bearing surfaces, each of said surfaces having a stop at one end thereof, the material of said member inclusive of said bearing surfaces being shaped to provide a plurality of inclined cam segments connected by shoulder portions joining the adjacent ends of contiguous segments.

17. For use in a fastening device of the character described, a bearing member having an aperture shaped to provide a plurality of perimetrally interrupted marginal bearing surfaces, at least one of said surfaces having a stop projecting upwardly from one end thereof, and a cam inclined upwardly from the other end, and portions for engaging a carrier member to hold the members in assembled relation.

18. For use in a fastening device of the character described, an annular plate like bearing member having a central aperture shaped to provide a plurality of perimetrally interrupted segmental marginal bearing surfaces, at least one of said surfaces having a stop projecting upwardly from one end thereof, and a plurality of perimetrally spaced projections extending from the outer portion of the annulus for securing said member to a carrier member.

19. For use in a fastening device of the character described, a bearing member having a central aperture shaped to provide a plurality of perimetrally interrupted marginal bearing surfaces, an upwardly projecting stop at one end of each of said surfaces and portions for movably securing said member to a carrier member.

20. For use in a fastening device of the character described, a bearing member having a central aperture shaped to provide a plurality of perimetrally interrupted marginal bearing surfaces, an upwardly projecting stop at one end of each of said surfaces and an upwardly inclined cam at the opposite end of each of said surfaces.

ROBERT LAY HALLOCK.